United States Patent
Kekre et al.

(10) Patent No.: US 8,375,181 B1
(45) Date of Patent: Feb. 12, 2013

(54) SYSTEM AND METHOD FOR PERFORMING REPLICATION BASED ON CHANGE TRACKING INFORMATION

(75) Inventors: Anand A. Kekre, Pune (IN); Weibao Wu, Roseville, MN (US); John A. Colgrove, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1883 days.

(21) Appl. No.: 10/975,742

(22) Filed: Oct. 28, 2004

(51) Int. Cl.
*G06F 12/00* (2006.01)
*G06F 13/00* (2006.01)
*G06F 13/28* (2006.01)
*G06F 11/00* (2006.01)

(52) U.S. Cl. .......................... 711/162; 714/5
(58) Field of Classification Search ............. 711/162
See application file for complete search history.

(56) References Cited

U.S. PATENT DOCUMENTS

| | | | | |
|---|---|---|---|---|
| 6,446,175 | B1 * | 9/2002 | West et al. | 711/162 |
| 6,622,152 | B1 | 9/2003 | Sinn et al. | 707/204 |
| 2003/0145248 | A1 | 7/2003 | McNeil | 714/13 |
| 2003/0163553 | A1 * | 8/2003 | Kitamura et al. | 709/219 |

OTHER PUBLICATIONS

Microsoft Computer Dictionary, Fifth Edition, Microsoft Press, Copyright 2002, p. 211.*
Wu, Weibao, et al., pending U.S. Patent Application entitled "Volume-Based Incremental Backup and Recovery of Files," U.S. Appl. No. 10/610,134, filed Jun. 30, 2003, including Specification: pp. 1-27; Drawings: Figures 1-7 on 7 sheets.
Veritas Software Corporation, "Storage File Mapping in Databases", Apr. 22, 2003, 9 pages, http://www.veritas.com/van/articles/2876.html.

\* cited by examiner

*Primary Examiner* — Michael Alsip
(74) *Attorney, Agent, or Firm* — Campbell Stephenson LLP

(57) ABSTRACT

Data-object-level replication is performed based on storage-device-level change tracking. A method of replicating a data object (such as a file) involves accessing mapping information and change information. The mapping information identifies that one or more regions of a storage device (such as a logical volume) store portions of the data object. The change information identifies whether the regions of the storage device, which were identified by the mapping information, have been modified subsequent to a particular point in time. If the change information identifies that any of those regions of the storage device have been modified, replication of each modified one of the regions to a secondary system is initiated. Replication can be initiated from a system other than the production system.

30 Claims, 7 Drawing Sheets

File Change Log 200

| File D | Time A |
|---|---|
| File H | Time B |
| ⋮ | ⋮ |
| File M | Time N |

File Change Log Entries

FIG. 2

File Mapping Information 300

| File A - Size and Number of Extents | Extent Information for File A ||||
|---|---|---|---|---|
| | Extent 1 | Extent 2 | • • • | Extent X |
| File B - Size and Number of Extents | Extent Information for File B ||||
| | Extent 1 | Extent 2 | • • • | Extent X |
| ⋮ | ⋮ ||||
| File N - Size and Number of Extents | Extent Information for File N ||||
| | Extent 1 | Extent 2 | • • • | Extent X |

Entries

FIG. 3

SYSTEM AND METHOD FOR PERFORMING REPLICATION BASED ON CHANGE TRACKING INFORMATION

FIELD OF THE INVENTION

This invention relates to data processing systems and, more particularly, to the replication of files in a data processing system.

BACKGROUND

Data replication is a technique used to maintain copies of data at separate locations. For example, data can be replicated on several different sites within a corporation's campus and/or on several different ones of the corporation's campuses. If the data is replicated at different sites, and if the failure of the systems storing the data at one site is unlikely to cause the failure of the corresponding systems at another site, replication can provide increased data reliability. Thus, if a disaster occurs at one site, an application that uses that data can be restarted using a replicated copy of the data at another site.

The system (e.g., the host) that consumes and/or modifies the data that is being replicated is referred to as the production system. For example, a host implementing a file system is the production system with respect to the data organized by the file system.

Typically, replication activities fall into one of three categories: database replication, file-level replication, and volume-level replication. Database replication is limited to use with databases. File-level replication is based on tracking changes to the data at the file level. Whenever a modification to a file is detected (e.g., by the file system or a filter driver), that modification is replicated to the secondary site. One drawback to file-level replication is that typically, both the primary and the secondary site need to use the same file system in order for replication to be successful. Another drawback is that the replication must be initiated by the production system. Accordingly, the functionality needed to initiate replication consumes resources at the production system. This can interfere with the ability of other applications executing on the production system to provide services to clients and/or users in a timely and efficient manner.

In contrast to file-level replication, volume-level replication tracks changes at the volume level. Replication can be performed on data volumes by designating one volume as the primary volume. One or more secondary volumes are then synchronized with the primary volume. These secondary volumes can each be located at a different secondary site. Initially, a secondary volume can be synchronized to the primary volume by copying all of the data on the primary volume to the secondary volume. The data on the primary volume can be copied to the secondary volume by transferring all the data over the network, by creating a backup of the primary volume and restoring the secondary volume from the backup, or by attaching one or more mirrors of the primary volume to the secondary volume. Replication then continues by propagating any changes to data in the primary volume to the secondary volumes.

One drawback of volume-level replication is that all changes to data within the volume are replicated, even if it is not necessary to replicate some portions of the volume. For example, it may not be necessary to replicate changes to file system metadata stored on the volume. Similarly, in a software development environment, it is not necessary to replicate executable files as long as the corresponding source files (which can be used to regenerate the executable files) are replicated. However, since changes are tracked at the volume level, there is no way to differentiate between file data and file system metadata or between different types of files, and thus changes to both types of data and/or both types of files will be replicated. Another drawback of volume-level replication is that a small file-level change can cause an entire page to be flushed to the volume, which will in turn cause the entire page to be replicated to the secondary site. This unnecessarily increases the amount of data transfer on the network.

As the above examples show, there are potential drawbacks to using file-level, database replication, and volume-level replication. Accordingly, new techniques for replicating data are desired.

SUMMARY

Various embodiments of systems and methods are disclosed for performing file-level replication based on volume-level change tracking. In one embodiment, a method involves initiating a write to a data object (e.g., a file). Writes to the data object are initiated at a production system. The method also involves initiating replication of the data object. Unlike writes to the data object, replication of the data object is initiated by a non-production system (i.e., a system that is not a production system).

In one embodiment, a method of replicating a data object involves accessing mapping information and change information. The mapping information identifies that one or more regions of a storage device (e.g., such as a logical volume) store portions of the data object. The change information identifies whether the regions of the storage device, which were identified by the mapping information, have been modified subsequent to a particular point in time. If the change information identifies that any of those regions of the storage device have been modified, replication of each modified one of the regions to a secondary system is initiated.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 2 shows an example of a file change log.

FIG. 3 shows an example of file mapping information.

Figure 1:
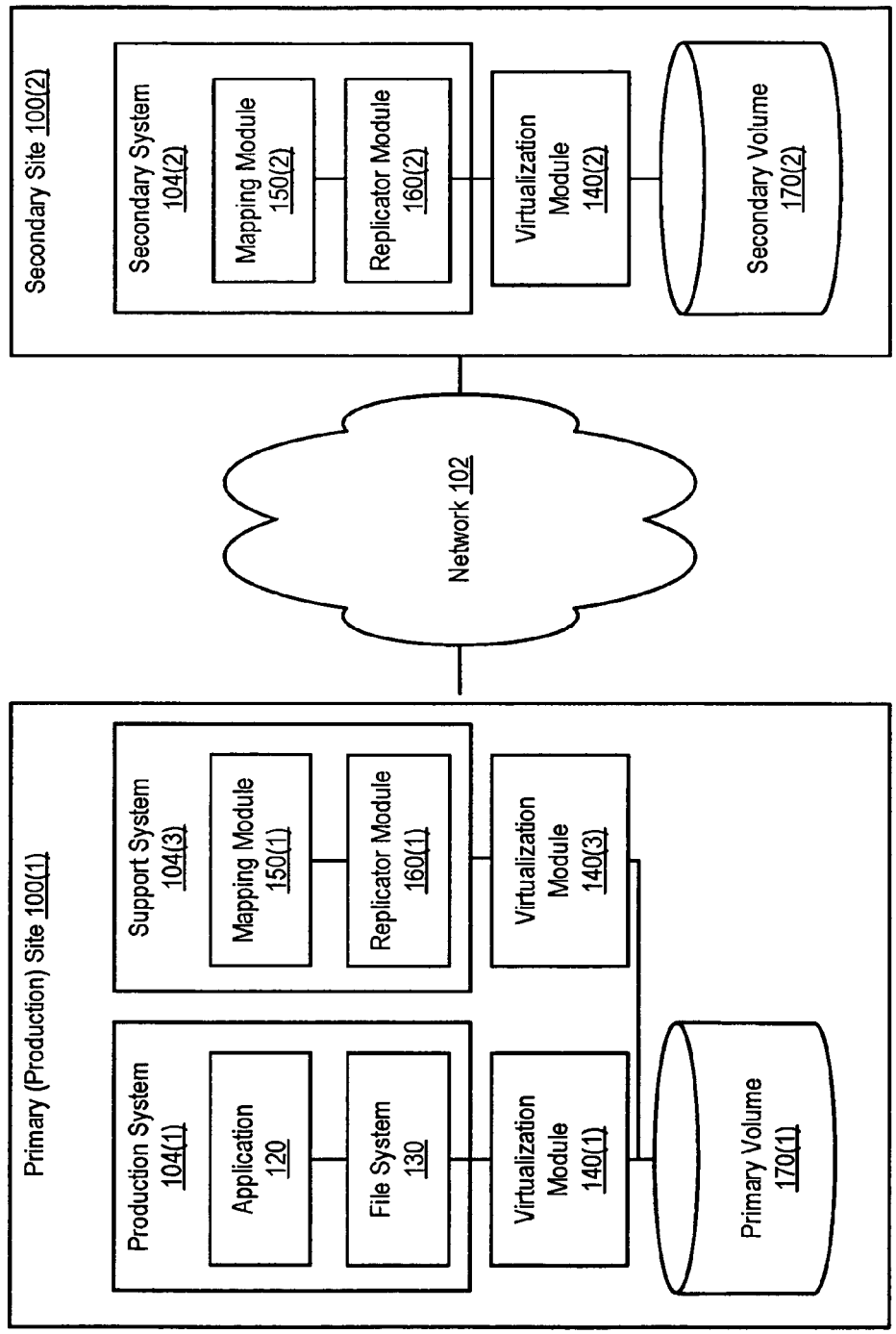
FIG. 1 shows a system that replicates data from a primary site to a secondary site, according to an embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Replication uses mapping information and change tracking information. A data object (e.g., a file) includes one or more extents. The mapping information maps each extent of the data object to be replicated to a region of a storage device. The change tracking information identifies which regions of the storage device have changed since a previous point in time. The storage device can be a virtualized device or other device abstraction provided by software and/or firmware on a computer system (e.g., a server, network device, appliance, storage array controller, storage device controller, or the like), and the software and/or firmware that provides the virtualization generates the change tracking information. Alternatively, the storage device can be a non-virtualized device (e.g., a storage array, in which the array controller generates the change tracking information).

Initially, all of the data objects to be replicated are copied from the primary site (where the production system is located) to a secondary site. Such initial synchronization can be performed by transferring the data objects over a network and/or by using a conventional backup and/or restore mechanism. Once the initial synchronization is complete, incremental transfers (also referred to as differential transfers) are performed periodically. Each subsequent replication period, for each data object to be replicated, the mapping information is used to identify each region of the storage device that stores a portion (e.g., an extent) of the data object. Then, the change tracking information is used to determine whether the identified regions have been modified since the beginning of previous replication period. If any of the identified regions have been modified, copies of the modified regions are transferred from the primary site to a secondary site.

By using storage-device-level change tracking information to perform data-object-level (e.g., file-level) replication, certain disadvantages of both file-level and volume-level replication can be reduced. For example, because the replication is effectively taking place at the storage-device-level (e.g., volume-level), replication can be performed independently of the type of file systems (or other data abstraction functionality) in use at the primary and secondary sites. Accordingly, each site can use a different file system and/or file system layout (e.g., the primary site can implement a multi-device file system (MDS) (e.g., as available with VERITAS File System) while the secondary site implements a single-device UNIX File System (UFS)). Additionally, it is not necessary to initiate replication from the production system (i.e., the replication can be performed out-of-band). Thus the overhead associated with replication can be moved to another system other than the production system on the primary site. Such a system can be another host, an appliance, an intelligent Storage Area Network (SAN) switch, or a storage array controller.

Furthermore, since the replication depends on data-object-level information, it is possible to selectively replicate certain data objects without replicating certain others. Similarly, data objects can be replicated without replicating metadata (e.g., inodes, logs, and the like) that is associated with those data objects.

Additionally, replication can be performed with little involvement of the production system. For example, the mapping information can be extracted by another system at primary site by an application such as VERITAS Federated Mapping Services (VxMS). Similarly, techniques such as disk group split and join can be used to obtain snapshots of the primary storage device (or devices) at the secondary site without interfering with the operation of the production system.

FIG. 1 shows a system that replicates files from a primary volume to a secondary volume. This system includes primary site 100(1) and secondary site 100(2). Collectively, sites 100(1) and 100(2) are referred to as sites 100. Primary site 100(1) and secondary site 100(2) are coupled by network 102. Network 102 can include a WAN (Wide Area Network), such as the Internet, one or more LANs (Local Area Networks), and/or one or more SANs (Storage Area Networks).

Site 100(1) includes production system 104(1), which implements the functionality of application 120 and file system 130. Site 100(1) also includes virtualization module 140(1) and a primary volume 170(1). In some embodiments, virtualization module 140(1) is implemented in hardware and/or software on a network switch, network appliance, or storage device controller (e.g., an array controller). In alternative embodiments, virtualization module 140(1) is implemented in software that executes on production system 104(1).

While FIG. 1 illustrates a situation in which there is a single production system with respect to data in primary volume 170(1), it is noted that in alternative embodiments, multiple production systems can be present. For example, a distributed file system (such as the cluster file system (CFS) provided by VERITAS Storage Foundation™, available from VERITAS Software Corp., of Mountain View, Calif.) can be executed on each of several different nodes within a cluster, allowing each node to act as a production system.

Site 100(1) also includes support system 104(3). Support system 104(3) implements the functionality of a replicator module 160(1) and a mapping module 150(1). Support system 104(3) also includes an optional virtualization module 140(3) (alternatively, support system 104(3) can share a virtualization module with production system 104(1)).

While replicator module 106(1) and mapping module 150(1) are shown as being implemented on the same system in the illustrated example, it is noted that replicator module 160 and mapping module 150 can be implemented on different systems than each other in other embodiments. Similarly, one or both of replicator module 160(1) and mapping module 150(1) can be implemented on production system 104(1) (as opposed to being implemented on a different system than file system 130 as shown in FIG. 1) in alternative embodiments.

Site 100(2) includes secondary system 104(2), which implements the functionality of replicator module 160 and mapping module 150, as well as virtualization module 140(2) and a secondary volume 170(2). Like virtualization module 140(1), virtualization module 140(2) can be implemented in hardware and/or software on secondary system 104(2) or on another device (e.g., a network switch, appliance, or storage device controller).

File system 130 provides the interface via which users, such as application 120, access files on primary volume 170

(1). Accordingly, the production system controls access to files on primary volume 170(1). It is noted that the production system could implement other mechanisms (e.g., databases, object-based storage, or the like) for abstracting data objects on volume 170(1) instead of and/or in addition to file system 130. In general, the production system includes functionality that provides an abstraction of data to user applications and that maps abstract data objects such as files to locations on a storage device (e.g., primary volume 170(1)).

Each system 104(1), 104(2), and 104(3) (collectively, systems 104) can include one or more computing devices configured to execute software implementing various applications (e.g., application 120, file system 130, virtualization module 140(1) or 140(2), mapping module 150(1) or 150(2), and/or replicator module 160(1) or 160(2)). In such embodiments, each system 104 can include a workstation, personal computer, server, PDA (Personal Digital Assistant), cell phone, storage network switch, storage device, storage array controller, or any other device configured to execute software implementing such applications. Alternatively, each system 104 can be implemented from one or more logic devices (e.g., PLDs, FPGAs, and the like) configured to perform the functions of such applications. Systems 104 can also be implemented using logic devices that are configured to perform some of the functions of the applications and that are also configured to execute software implementing other functions of the applications.

Application 120 is an example of an application that accesses files on primary volume 170(1) via file system 130. Application 120 can be any one of a variety of applications, such as a database application, a word processing application, and the like. It is noted that in some embodiments, application 120 is distributed in nature (e.g., like Oracle Parallel Server™ or Oracle RAC™). Such applications can access the same data (or files) from different production systems.

File system 130 organizes and provides access to files within volume 170(1). File system 130 maintains information that indicates how each file maps to the underlying volume. For example, a file can be subdivided into three extents. These extents can be stored in non-contiguous locations, with respect to each other, on the underlying volume. File system 130 tracks the starting location (e.g., as identified using a logical block address (LBA)) of each extent within the file, as well as the length of each extent, if variable-sized extents are supported. It is noted that file extents may differ in size from volume extents. For example, one file extent can include several volume extents or vice versa.

In some embodiments, file system 130 maintains a file change log (FCL). The file change log identifies files that have recently been modified, created, or deleted. Each time file system 130 detects a write or other modification (e.g., deletion) to a file, file system 130 adds information (e.g., a pathname) identifying the modified file to the file change log or otherwise updates the file change log to indicate that the file has been modified. In one embodiment, such a file change log tracks both the identity of each modified file and the time at which each modified file was most recently modified. Files can be removed from a file change log after a prespecified amount of time (e.g., files can periodically be removed from the file change log). Alternatively, file can be removed from the file change log in response to an explicit removal command (e.g., triggered each time the file system is backed up) or based on the number of files currently identified within the file change log (e.g., if a maximum number of files are identified within the file change log, the oldest entry in the file change log can be removed to make room for a newer entry).

Virtualization modules 140(1) and 140(2) (collectively, virtualization modules 140) each create and manage one or more logical storage devices, called volumes, such as primary volume 170(1) and secondary volume 170(2). Each virtualization module 140 can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Mapping module 150(1) extracts (e.g., by communicating with file system 130) information that maps each file managed by file system 130 to one or more corresponding regions of primary volume 170(1). As noted above, files can be subdivided into variable-sized extents. Within each extent, blocks are stored contiguously on the underlying volume. However, the extents themselves may not be stored contiguously on the underlying volume. As noted above, file system 130 keeps track of the mapping of file extents to the underlying volume. Mapping module 150(1) can routinely (e.g., periodically) query file system 130 for the mapping information. It is noted that in some embodiments, mapping module 150(1) is implemented as part of file system 130. However, in the illustrated embodiment, mapping module 150(1) is implemented separately from file system 130. This allows mapping module 150(1) to be executed on a system (e.g., support system 104(3)) other than the production system on the primary site. In one embodiment, mapping module 150(1) is implemented using VERITAS Federated Mapping Service software, available from VERITAS Software Corp., of Mountain View, Calif. A similar mapping module 150(2) can be implemented on secondary system 104(2).

Replicator modules 160(1) and 160(2) at the primary and secondary sites cooperate to maintain replicas, (i.e., consistent copies) of one or more of the files on primary volume 170(1) on secondary volume 170(2). Consistency ensures that, even if the secondary volume is not identical to the first volume (e.g., updates to the secondary volume may lag behind updates to the primary volume), the secondary volume always represents a state of the primary volume that actually existed (or could have existed without violating any write-ordering rules) at a previous point in time. For example, if an application performs a sequence of writes A, B, and C to the primary volume, consistency can be maintained by performing these writes to the secondary volume in the same sequence. At no point should the secondary volume reflect a state, such as the state that would have occurred if write C was performed before write B, that never actually occurred on the primary volume.

In this example, replicator modules 160(1) and 160(2) (collectively, replicator modules 160) use periodic replication techniques to maintain replicas of the files. In periodic replication, replicator module 160(1) on support system 104(3) at primary site 100(1) periodically detects which files on primary volume 170(1) have been modified (since the last replication period) and copies the changed portions of those files to secondary volume 170(2). In one embodiment, replicator module 160(1) is implemented as part of a backup component such as VERITAS NetBackup™, available from VERITAS Software Corp., of Mountain View, Calif.

Replicator module 160(1) accesses information that identifies the files to be replicated from primary volume 170(1) to secondary volume 170(2). For example, replicator module 160(1) can maintain a list that identifies each file to be replicated by pathname. Replicator module 160(1) communicates with mapping module 150(1) in order to obtain mapping information for each of the files to be replicated. This mapping information maps each of the files to one or more regions of primary volume 170(1). Replicator module 160(1) then communicates with virtualization module 140(1) or 140(3), if implemented, to determine whether any of the regions of primary volume 170(1), to which the files are mapped, have been modified since the last time that replicator module 160(1) updated secondary volume 170(2). If any of the regions have been modified, replicator module 160(1) reads the modified regions and sends the modified regions to replicator module 160(1), which then writes the modified regions to secondary volume 170(2). It is noted that replicator module 160(1) does not copy modified regions of primary volume 170(1) that do not map to one of the files being replicated. Furthermore, replicator module 160(1) does not copy a region of primary volume 170(1) that maps to one of the files being replicated unless that region has also been modified.

If a separate virtualization module 140(3) is implemented on support system 104(3), replicator module 160(1) can directly read the changed regions of primary volume 170(1) via virtualization module 140(3). Thus, replication can be performed without having to go through the virtualization module being used by production system 104(1). Such an arrangement is possible if virtualization modules 140(1) and 140(3) perform distributed block virtualization (e.g., as provided by VERITAS Storage Foundation™, available from VERITAS Software Corp., of Mountain View, Calif.). In an alternative embodiment, replicator module 160(1) can use volume mapping information (e.g., also provided by mapping module 150(1), to directly read the changed regions of primary volume 170(1) from the physical disks on which primary volume 170(1) is implemented.

Replicator module 160(1) can also access a file change log (maintained by file system 130) when performing replication. For example, before requesting mapping information from mapping module 150(1), replicator module 160(1) can access the file change log. Instead of requesting mapping information for all of the files to be replicated, replicator module 160 can only request mapping information for the files that the file change log identifies as having been modified, created, and/or deleted since the last replication period.

Each data volume 170(1) and 170(2) can be implemented on one or more physical storage devices. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one data volume can be implemented on the same physical storage device. It is noted that although a logical storage volume is shown in the illustrated example, other embodiments can use similar techniques to replicate data objects (such as files) that are stored directly on a physical storage device. In such embodiments, the mapping information maps the extents of each file directly to an extent of the physical storage device (the change information can be provided by the storage device, and thus virtualization modules may not be used in such embodiments).

While FIG. 1 illustrates a system configured to replicate files on a single data volume, other embodiments support replication of files from multiple data volumes. In such embodiments, the group of data volumes at the primary site 100(1) can be included in a primary replication volume group. Files on this primary replication volume group are then replicated to one or more volumes at the secondary site 100(2).

In some embodiments, there are multiple secondary volumes 170(2) (or replication volume groups) to which replicator module 160 replicates files in primary volume 170(1) (or a primary replication volume group). Identical replication operations are typically performed to all secondary volumes.

The example of FIG. 1 shows mapping modules 150(1) and 150(2), file system 130, replicator modules 160(1) and 160(2), and virtualization modules 170(1) and 170(2) as independent modules. It is noted that in alternative embodiments, the functionality of these modules can be combined and/or implemented in other ways. For example, mapping module 150(1) and replicator module 160(1) can be combined into a single module.

FIG. 2 shows an example of information that can be maintained in a file change log by a file system. In this example, file change log 200 includes several file change log entries. Each file change log entry identifies a file and a time at which that file was most recently modified. For example, the top entry identifies File D (e.g., using the pathname of File D) as having been modified at time A. The next entry identifies File H as having been modified at time B. The bottommost entry in FIG. 2 shows File M as having been modified at time N. File change log can be maintained by a file system and updated whenever a file is modified.

It is noted that in other embodiments, a file change log can include less information than illustrated in FIG. 2. For example, a file change log can simply identify each file (e.g., by pathname) that has been modified subsequent to a particular point in time, without actually identifying the time at which each identified file was modified. Similarly, a file change log can include different information in addition to and/or instead of the information shown in FIG. 2.

FIG. 3 shows an example of file mapping information 300 that can be maintained (e.g., by mapping module 150 of FIG. 1). As described above, the data within a file can be stored in non-contiguous locations on the underlying volume. Each set of contiguously stored data within a given file is referred to as an extent. The file system can maintain file mapping information 300 in order to describe contiguous blocks of data written to a device (e.g., primary volume 170(1) of FIG. 1) managed by the file system.

File mapping information 300 includes an entry for each file managed by the file system. In this example, entries for three files, File A, File B, and File N, are shown. For each file, the entry includes information related to each file, including file size and the number of file system extents that make up the file. Each entry also includes information for each extent (as shown, each file can include a variable number of extents, ranging from 1 to X). The information maintained for each extent locates the extent within a device (e.g., primary volume 170(1)). Such information can include device offset (e.g., the logical block address of the first block within the extent), extent size (e.g., the length of the extent in blocks), file offset (e.g., identifying the location of the extent relative to other extents within the file), type (e.g., data, parity, or data and parity), and the name of the storage component (e.g., the name of a logical disk within a disk group on which a volume is implemented) on which the extent resides. It is noted that in a multi device file system like the one supported by VERITAS File System, different extents of a given file can be stored on different devices (or different volumes). In such situations, the file mapping information would include information identifying the location of each extent within a device along with the information identifying the particular device to which that extent is mapped. It is noted that in some embodiments, file mapping information can also include different information in addition to and/or instead of the information illustrated in FIG. 3. For example, file mapping information 300 can include information such as file type for each file.

In one embodiment, file mapping information 300 is obtained from vendor-supplied file mapping libraries. Such libraries can be provided for each layer of the I/O stack. The mapping information can also be consolidated into a single library (e.g., as provided by applications such as VERITAS Federated Mapping Service VxMS and the like).

Figure 4:
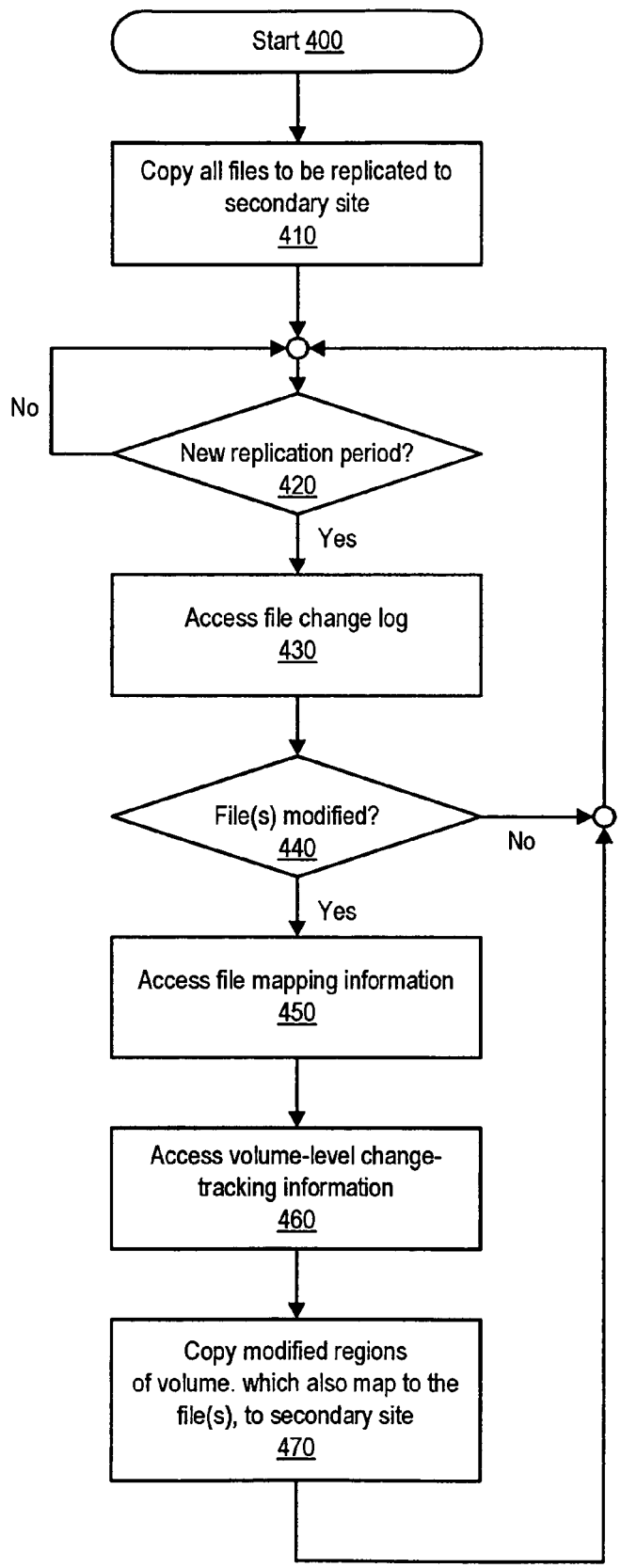
FIG. 4 is a flowchart illustrating one embodiment of a method of performing file-level replication based on volume-level change tracking information.

FIG. 4 shows a method of replicating files. The functions shown in FIG. 4 can be performed by replicator module 160 (e.g., as shown in FIG. 1). The method begins at 400. At 410, all of the files that are to be replicated are copied to the secondary site. It is noted that a user can select fewer than all of the files at the primary site for replication. For example, if the files are used by a software development team, source files, but not executable files, can be selected for replication. Function 410 occurs regardless of whether each of the files has been modified. The files can be copied to the secondary site by reading each file from the primary site and writing each file to a secondary volume at the secondary site (e.g., file-level copying can be performed by interacting with file systems implemented at the primary and secondary sites, respectively). In another embodiment, the initial copying can be avoided by using a backup or restore operation to synchronize the files at the secondary volume with the files at the primary volume (e.g., the secondary volume can be restored from a backup copy of the primary volume). Similarly, a mirrored copy of the primary volume can be used to construct the secondary volume.

After function 410 is performed, periodic replication begins. During periodic replication, changes to the files on the primary volume that occur during a particular period are copied to the secondary volume during the next period.

At 420, the beginning of a new replication period is detected. In response to detecting that a new replication period has begun, a file change log is accessed, as indicated at 430. The file change log identifies the files that have recently been modified. The file change log can also indicate the addition or deletion of files, allowing those files to be added or removed from the set of files being replicated, as appropriate. For example, if the file change log indicates that a file, currently included in the set of files being replicated, has been deleted on the primary volume, meta-information identifying the file and the deletion can be conveyed to the secondary site, causing the secondary site to also delete the file. If the file change log indicates that a file has been added and that file is part of the class of files being replicated, that file will be replicated along with any other files that have been added or modified.

Based on the file change log, a determination as to whether any of the files being replicated were modified during the last replication period, as shown at 440. If the file change log indicates that any of the files being replicated were modified during the last replication period, as determined at 440, file mapping information for the modified files is accessed, as shown at 450. For example, if file change log indicates that file A was modified at time T1, and if the previous replication period occurred between T0 and T2 (such that T0<T1<T2), file mapping information for file A can be requested. It is noted that file mapping information can be requested for all files, only for the files selected for replication, or only for the files selected for modification and identified (by the file change log) as having been modified.

Volume-level change-tracking information is also requested, as shown at 450. The volume-level change-tracking information indicates which regions of the volume have been modified subsequent to a particular point in time or within a particular period. Requesting the volume-level change-tracking information can involve requesting change-tracking information for the entire volume or requesting change-tracking information for particular portions of the volume. For example, based on the file change log information and the file mapping information, a request can be generated for change-tracking information for the portions of the volume that store the files identified as having been modified. The volume-level change-tracking information is obtained from snappoints in some embodiments, as discussed in more detail below.

Using the information in the file change log, as well as the file mapping information and volume-level change-tracking information, it is possible to identify the particular regions of the volume that store the changed portion of each file being replicated. The regions of the modified files that are identified by the volume-level change-tracking information are copied to the secondary site, as indicated at 470. The unmodified regions of the modified files are not copied to the secondary site. For example, consider a situation where file A is being replicated, and file change log indicates that file A has recently been modified. The file mapping information for file A indicates that file A includes three extents, which map to regions 1, 6, and 7 of the volume. The volume-level change tracking information for the volume indicates that of those three regions, only region 6 has been modified since the last replication period. Accordingly, replication of the changes to file A is performed by simply copying region 6 to the secondary site. Regions 1 and 7 are not copied.

Copying the modified regions of the modified files to the secondary site can involve sending copies of the modified regions, as well as meta-information, to the secondary site. Such meta-information can include the file name and extent. Since less than the entire file may be copied, this allows the copied data to be stored at the proper offset within the file.

It is noted that function 470 can involve copying the modified regions to a snapshot of a secondary volume at the secondary site, and then restoring the secondary volume from the snapshot. Applying the modified regions to the snapshot can involve accessing mapping information that maps each file to the secondary volume in order to locate each region on the secondary volume. Alternatively, the modified regions can be written directly to the secondary volume.

After performance of function 470, the method returns to function 420 in order to determine whether a new replication period has begun. This process can continue for as long as replication of the selected file(s) is desired.

It is noted that the functions performed in blocks 410-470 can be performed in a different order than that shown in FIG. 4. For example, file mapping information can be accessed subsequent to volume-level change-tracking information. Additionally, certain functions can be omitted. For example, in an alternative embodiment, file change log information is not accessed, and thus function 430 is omitted. In such an embodiment, the file mapping is performed for all the files that are being replicated.

Figure 5:
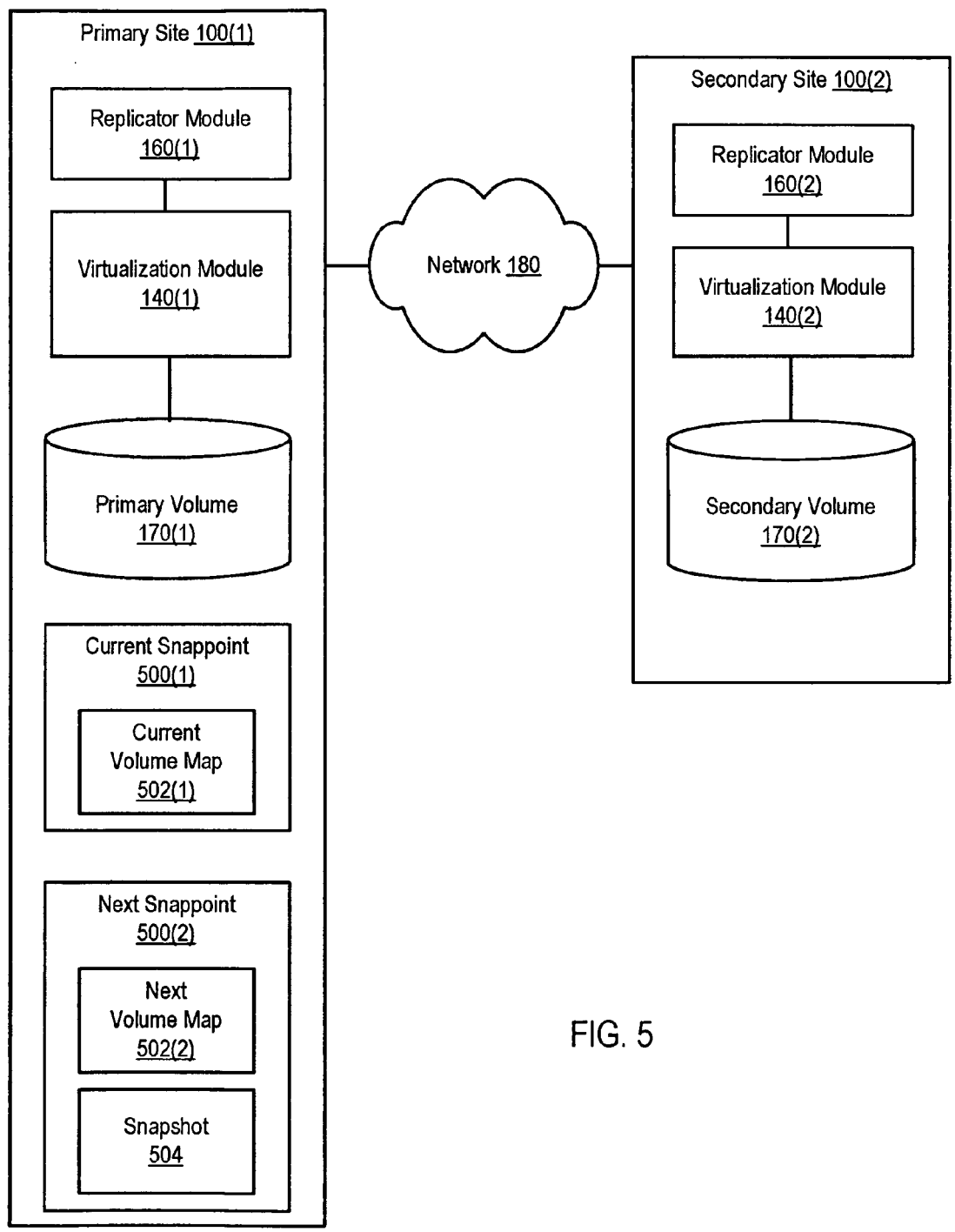
FIG. 5 illustrates a system that replicates data using volume-level change tracking information obtained from snappoints, according to one embodiment of the present invention.

FIG. 5 illustrates more details of a system that performs file replication. This system includes similar components to the system of FIG. 1, as indicated by the use of similar reference numerals. In this example, two snappoints, "Current" snappoint 500(1) and "Next" snappoint 500(2), are maintained at primary site 100(1). These snappoints are used to obtain volume-level change-tracking information, which is used to perform file-level replication.

At primary site 100(1), virtualization module 140(1) manages two snappoints, Current snappoint 500(1) and Next snappoint 500(2), of primary volume 170(1). Each snappoint provides information about the changes to primary volume 170(1) with respect to a point-in-time copy of that volume. Each snappoint includes information indicating which portions of the primary volume 170(1) have been modified after the point in time of that snappoint's creation and prior to the point in time of a subsequent snappoint's creation. Current snappoint 500(1) maintains this information in current volume map 502(1). Next snappoint 500(2) maintains information indicative of changes to the primary volume 150(1) subsequent to the creation of next snappoint 500(2) in next volume map 502(2). Snappoints such as Current snappoint 500(1) and Next snappoint 500(1) provide applications with the ability to create incremental images of primary volume 170(1) and retrieve the information about the changed regions between any two images. This retrieved information is an example of volume-level change-tracking information.

In one embodiment, current volume map 502(1) is a bitmap in which each bit represents a region of primary volume 170(1). The value (e.g., set or clear) of each bit in such a bitmap indicates whether the region corresponding to that bit was modified during the period recorded by Current snappoint 500(1). Each region can correspond to one or more blocks or volume extents on the underlying volume. Next volume map 502(2) can also be implemented as a bitmap. It is noted that in alternative embodiments, structures other than bitmaps may be used to implement current volume map 502(1) and/or next volume map 502(2). For example, in one embodiment, current volume map 502(1) may include a list of regions of primary volume 170(1) modified during the period recorded by Current snappoint 500(1).

Each region of primary volume 170(1) can be described as a volume extent. Each volume extent is identified using a starting address and a value representing the length of the volume extent (in embodiments that only support a single volume extent length, the value representing the length may be omitted). It is noted that extents of files and volume extents can have different sizes and characteristics. For example, a given extent of a file can map to several volume extents of primary volume 170(1). Similarly, in some embodiments, a typical extent of a file can include several blocks, while each volume extent includes a single block. Many other variations on the relationships between volume extents and extents of files are possible.

Snappoints 500(1) and/or 500(2) can also include information indicative of a particular state of the primary volume at the point in time of each snappoint's creation. For example, Next snappoint 500(2) includes a snapshot 504 of the primary volume at the point-in-time at which Next snappoint 500(2) was created. In one embodiment, snapshot 504 is a Copy-On-Write (COW) snapshot (in alternative embodiments, other types of snapshots, such as mirror-breakoff snapshots, can be used). If snapshot 504 is a COW snapshot, snapshot 504 includes the original values of any regions of primary volume 170(1) modified subsequent to the creation of the snapshot. For example, after snapshot 504 is created, an application (e.g., application 120 of FIG. 1) may write to a block of primary volume 170(1). Before the block is overwritten with the new value provided by the application, the original value of the block is copied to COW snapshot 504. Information in snapshot 504 indicating which block was modified is also updated in response to the write. In one embodiment, snapshot 504 is generated using the technique described in U.S. Pat. No. 6,785,789, titled "Method and Apparatus for Creating a Virtual Data Copy", by Anand A. Kekre, John A. Colgrove, Oleg Kiselev, Ronald S. Karr, and Niranjan S. Pendharkar. In the illustrated example, Current snappoint 500(1) is a dataless snappoint and Next snappoint 500(2) is a dataful snappoint. Current snappoint 500(1) is 'dataless' in that it lacks any data representing a point-in-time copy of primary volume 170(1) at the time when snappoint 500(1) was created. Next snappoint 500(2) is 'dataful' in that it includes data (here, snapshot 504) representing a point-in-time copy of primary volume 170(1) at the time when snappoint 500(2) was created.

Current snappoint 500(1) is created before Next snappoint 500(2). Current snappoint 500(1) records changes to primary volume 170(1) between the point in time of the Current snappoint's creation and the point in time at which next snappoint 500(2) is created. Next snappoint 500(2) records the changes to the primary volume 170(1) subsequent to that point in time. When a new Next snappoint is created (e.g., the new Next snappoint can be created when a new replication period begins, as described below), the Current snappoint 500(1) will be replaced with Next snappoint 500(2) (i.e., the snappoint that was previously named Next snappoint 500(2) becomes the Current snappoint). When Next snappoint 500(2) is converted to Current snappoint 500(1), Next snappoint 500(2) can also be converted to a dataless snappoint. Snapshot 504 can be cleared for reuse as part of the new Next snappoint. The information previously stored in Current snappoint 500(1) may be saved for later use or discarded. After Next snappoint 500(2) has been converted to Current snappoint 500(1), a new version of Next snappoint 500(2) is created.

Current volume map 502(2) identifies changes that occurred on volume 170(1) subsequent to the creation of Current snappoint 500(1) and prior to the creation of Next snappoint 500(2). If current volume map 502(2) identifies certain regions have been modified since the creation of snappoint 500(1), the value of the changed regions can be copied to the secondary site from snapshot 504.

Periods in periodic replication can be defined in terms of time, number of operations, volume of modified data, and/or other criteria. For example, replication can be performed every 10 seconds. In another example, replication is performed each time 25 operations modifying the primary volume complete. In yet another example, replication is performed each time 256 Kbytes of data is modified. Several criteria can be combined to define a replication period. For example, a replication period can be defined as the earliest of either 10 seconds elapsing or 25 operations to primary volume 170(1) completing. The same interval can be used to define the replication period and the periods for creating snappoints of primary volume 170(1). Similarly, in some embodiments, replication and snappoint creation are synchronized to each other (e.g., replicator module 160(1) can communicate the beginning of a new replication period to virtualization module 140(1), causing virtualization module 140(1) to generate a new Next snappoint of primary volume 170(1)).

Figure 6:
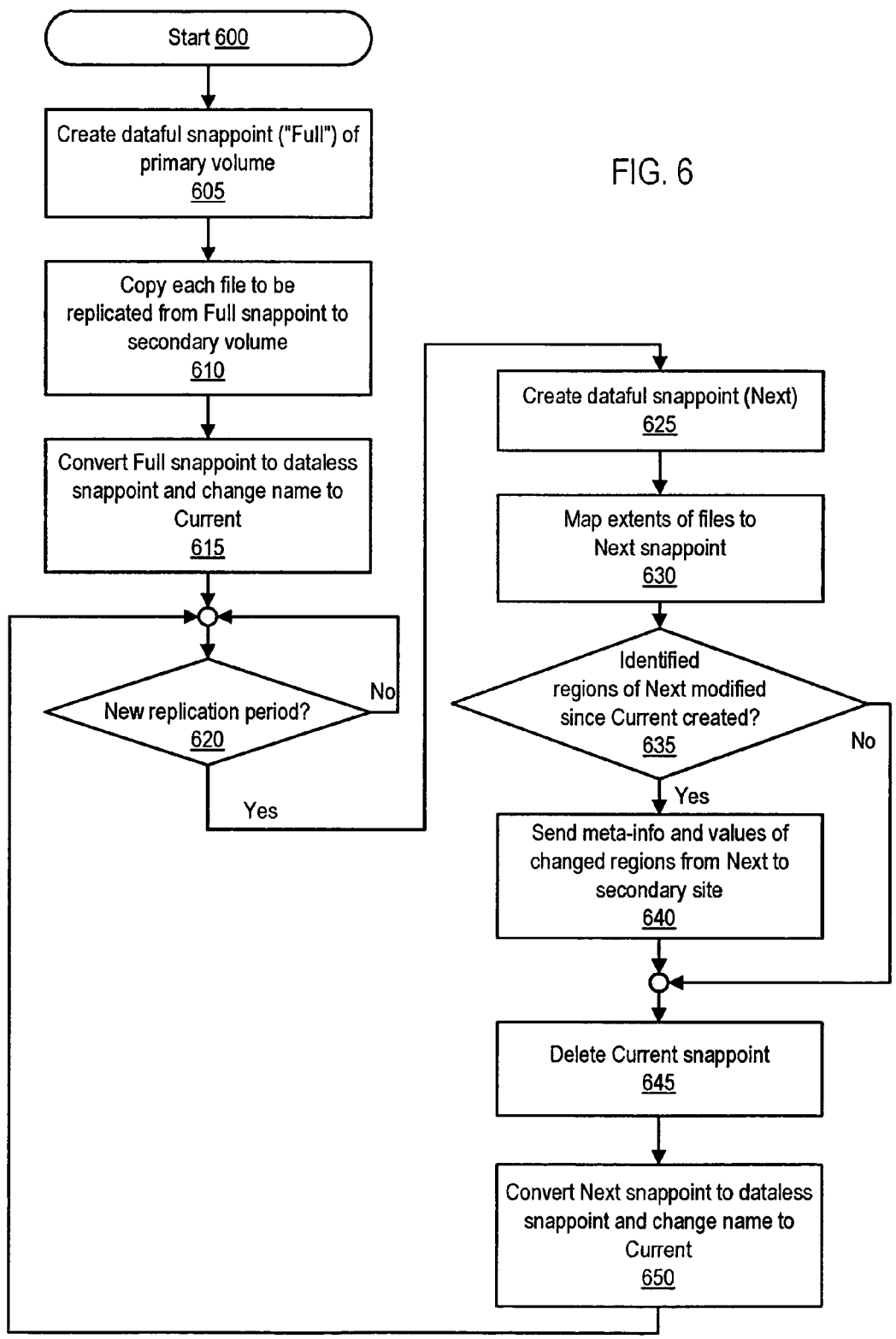
FIG. 6 is a flowchart showing another embodiment of a method of performing file-level replication based on volume-level change tracking information obtained from snappoints.

FIG. 6 is a flowchart of a method of using snappoints to obtain volume-level change-tracking information. This method is used in a system that includes a primary site and a secondary site. The files to be replicated are located at the primary site, which includes the production system for the files. A file system (or other facility, such as a database server with a built-in file system, that provides applications with access to the files) exists at both the primary and the secondary site. A different type of file system can be installed at each site.

The method begins at 600. At 605, a dataful snappoint of the primary volume is created. This dataful snappoint is referred to as the "Full" snappoint. The Full dataful snappoint includes a snapshot of the primary volume (e.g., created using mirror-breakoff or COW techniques) as well as information indicating the regions of the primary volume that have been modified subsequent to the creation of the Full snapshot and prior to the creation of a subsequent snappoint. It is noted that the snapshot (e.g., if the snapshot is created using COW techniques) and/or the information indicating changes can continue to be updated until a subsequent snappoint of the primary volume is created. For example, the information indicating changed regions is updated to indicate that the region has been modified. Similarly, if the snapshot is a COW snapshot, each time the primary volume is written, the old value of the region being written is copied to the COW snapshot.

At 610, each file to be replicated is copied from the Full snappoint to the secondary site. It is noted that fewer than all of the files at the primary site can be replicated to the secondary site. For example, a user can select files by type or name for replication, and only the selected files are replicated to the secondary site.

Once all of the files have been copied to the secondary site, the Full snappoint is renamed (615), becoming the "Current" snappoint. In this example, the renamed snappoint is also converted from a dataful snappoint to a dataless snappoint. As a part of such a conversion, the associated COW snapshot can be deleted in order to reduce the amount of space needed to store the Current snappoint.

Now that the full set of files to be replicated has been copied to the secondary site, periodic replication begins. A new replication period is detected, as shown at 620 (e.g., in response to a prespecified amount of time elapsing and/or a prespecified number of actions occurring). At the beginning of the new replication period, a new dataful snappoint is created (625). This dataful snappoint is named the Next snappoint It is noted that the snapshot within the dataful Next snappoint can be created using mirror-breakoff type snapshot techniques. Mirror-breakoff snapshot techniques don not incur any copy-on-write penalty, and thus such techniques can be used in situations in which it is desirable for replication to have as little effect on the production system as possible.

The extent(s) of each of the files to be replicated are mapped to the snapshot included in the Next snappoint, as shown at 630. The mapping information used to map the files to the snapshot can be obtained from a file system or mapping utility. By mapping the extents of the files to the snapshot, the portions of the snapshot that store the files are identified.

The change tracking information included in the Current snappoint is then accessed in order to determine whether the identified regions of the snapshot have been modified since the previous replication period, as shown at 635. For example, if file A maps to region 1, the volume map included in the Current snappoint can be accessed to determine whether region 1 was modified during the previous replication period.

If, at 635, it is determined that any of the identified regions have been modified subsequent to the creation of the Current snappoint, the value of the changed region(s) is sent from the snapshot (included in the Next snappoint) to the secondary site, as shown at 640. Meta-information associated with the values is also sent to the secondary site. For example, if the second extent within File B maps to region 3, and region 3 is being copied, meta-information identifying File B (e.g., using the fully-qualified pathname of File B) and also identifying the second extent within File B (e.g., by specifying an offset) is also sent to the secondary site.

It is noted that the extraction of the changes from the snapshot in the Next snappoint can be performed on the secondary site using disk group split and join (DGSJ) techniques, in which the snapshot is created on a logical disk within a disk group at the primary site. The logical disk is then removed, or split, from the disk group at the primary site and added, or joined, to a disk group at the secondary site. This reduces the impact of replication on the production system.

The secondary site saves the copied values to the appropriate files based on the meta-information. The copied values can be saved on file-by-file basis. For example, in response to receiving a value and associated meta-information, a file system at the secondary site uses the associated meta-information to identify the file and the location within the file to which the value should be written. Since the meta-information can be used regardless of the type of file system present at the primary and secondary site, different types of file systems and/or file systems with different layouts can be used primary and secondary sites.

Once functions 630-640 have been performed for all of the files being replicated, the Current snappoint can be deleted, as shown at 645. It is noted that, in some embodiments, this function is performed at the beginning of the replication period (e.g., prior to performance of function 625). Additionally, in some embodiments, the Current snappoint can be saved (e.g., under a name indicating the time at which the snappoint was created or a name reflecting the order of the snappoint within a series of snappoints) instead of being deleted. After the Current snappoint is removed (by deletion, as shown at 645, by renaming, or by some other comparable action), the Next snappoint is renamed as the Current snappoint, as shown at 650. The Next snappoint can also be converted to a dataless snappoint (e.g., by deleting the snapshot included within the Next snappoint). Functions 620-650 can then be repeated for subsequent replication periods. The method of FIG. 6 can be extended to multiple secondary sites by maintaining multiple pairs of Current and Next snappoints, each pair corresponding to one of the secondary sites.

Functions 605, 615, 625, 645, and 650 can be performed by the virtualization module for the primary volume. Functions 610, 630, 635, and 640 can be performed by a replication module, which is located at the primary site. In some embodiments, the virtualization module and replication module can communicate with each other in order to coordinate replication periods (e.g., in one embodiment, the virtualization module determines the replication period and communicates the beginning of new replication periods to the virtualization module, or vice versa). In other embodiments, the virtualization module and replication module determine replication periods independently of each other (e.g., each replication period is 5 minutes, with the initial period beginning at a prespecified time, and the replication module and virtualization module use a protocol such as Network Time Protocol to synchronize respective clocks). In still other embodiments, the virtualization module and replication module are integrated with each other.

If replication is interrupted (e.g., due to network link failures or unavailability of the secondary site), the Next snappoint will continue to track changes to the primary volume. Once the interruption ends, replication can restart in the state at which replication was interrupted.

One of the benefits of replication is that the secondary site can take over the role of production system if the primary site fails. In order to allow replication to continue (either to an additional site or to the primary site, if the primary site is returned to operation), a snappoint (e.g., a Full snappoint, as discussed in FIG. 6) is created for each volume on the secondary site before any applications are started on the secondary site. These snappoints continue tracking the changes to the files on new production system (at the secondary site) with respect to the values of those files on the old production system (at the primary site).

If the primary site resumes operation, the primary site can be used as either a new secondary site (by performing what is referred to as an "easy failback") or the new production system (by performing what is referred to as a "migration" or "takeover"). Both of these techniques involve synchronizing the volume(s) at the restored primary site with the changes made the files on secondary site (which now implements the production system) after the original failover. The snappoints that existed on the primary site (e.g., the Next snappoint and the Current Snappoint discussed in FIG. 6) prior to the failover and a snappoint created on secondary site (e.g., a Full snappoint) after the failover can be used to perform this synchronization, as shown in FIG. 7.

Figure 7:
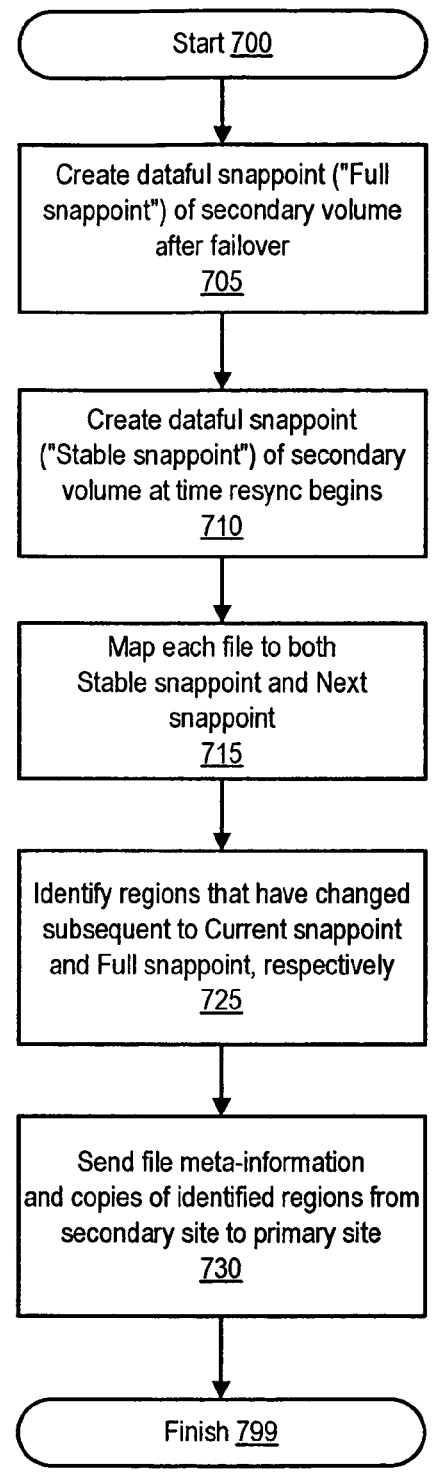
FIG. 7 is a flowchart of one embodiment of a method of resynchronizing files at a restored primary site with corresponding files at a secondary site.

FIG. 7 illustrates a method that can be used to resynchronize files on one or more volumes at a restored primary site with corresponding files at a secondary site, which took over operation as the production system when the primary site failed. The restored primary site still stores versions of the files, as those files existed prior to failover. Additionally, the primary site includes the Current snappoint and Next snappoint (as described above with respect to FIG. 6), as those snappoints existed when the failover occurred. The method begins at 700.

At 705, a dataful snappoint ("Full snappoint") of each secondary volume is created, just after the failover from the primary site to the secondary site. If there are multiple volumes at the secondary site, a separate snappoint is crated for each volume. This dataful snappoint can be created using COW or mirror-breakoff techniques, as described above. The Stable snappoint provides a baseline image of the secondary volume for use if the primary site later resumes operation and is resynchronized with the secondary site. A dataful snappoint ("Stable snappoint") of each secondary volume is also created at the time that resynchronization (resync) between the secondary site and the primary site begins, as shown at 710.

Each file (in the set of files being replicated) is mapped to both the Next snappoint (at the primary site) and the Stable snappoint (at the secondary site), as indicated at 715. This mapping is then used to identify which regions, if any, of those files were modified subsequent to the creation of the Current snappoint on the primary site as well as to identify which regions, if any, of those files were modified subsequent to the creation of the Full snappoint on the secondary site, as shown at 725. The values of the identified regions and associated meta-information are sent to the primary site from the secondary site, as shown at 730. The Next snappoint and the Failover snappoints can be deleted after all of the identified regions have been copied to the primary site. The method ends at 799.

After the files at the primary site are resynchronized with the files at the secondary site, replication can resume, as described in FIG. 6. As noted above, after the primary site resumes operation, the primary site can act as the production system (taking over the role of production system from the secondary site) or as a new secondary site for the existing production system (at the secondary site).

The above method assumes that a version of each file that is being replicated exists at both the primary and the secondary site and the size of each file has not changed. Exceptions to this assumption are handled as follows. If a file on new primary was deleted after failover, that file needs to be deleted at the primary site. Similarly, if a file on secondary site was truncated after failover, that file needs to be truncated on old primary. If a file has grown in size (e.g., by being extended to encompass one or more new extents) subsequent to the failover, the new extents need to be copied to the primary site. Additionally, if a file on secondary site has been created or added to the group of files being replicated subsequent to the failover, that file should be copied to the primary site.

The above situations can be detected by examining file mapping information at the primary and/or secondary sites (e.g., a file has been deleted if the there is no mapping information for that file at the secondary site, and a file has changed in size if the number of extents and/or file size tracked at the secondary site differs from that tracked at the primary site) or by consulting a file change log at the secondary site. For example, if a file change log maintained by the file system at the secondary site indicates that a file has been deleted, the replication module can send meta-information to the primary site identifying the file and indicating that the file has been deleted. In response, the file system at the primary site can delete the file.

Figure 8:
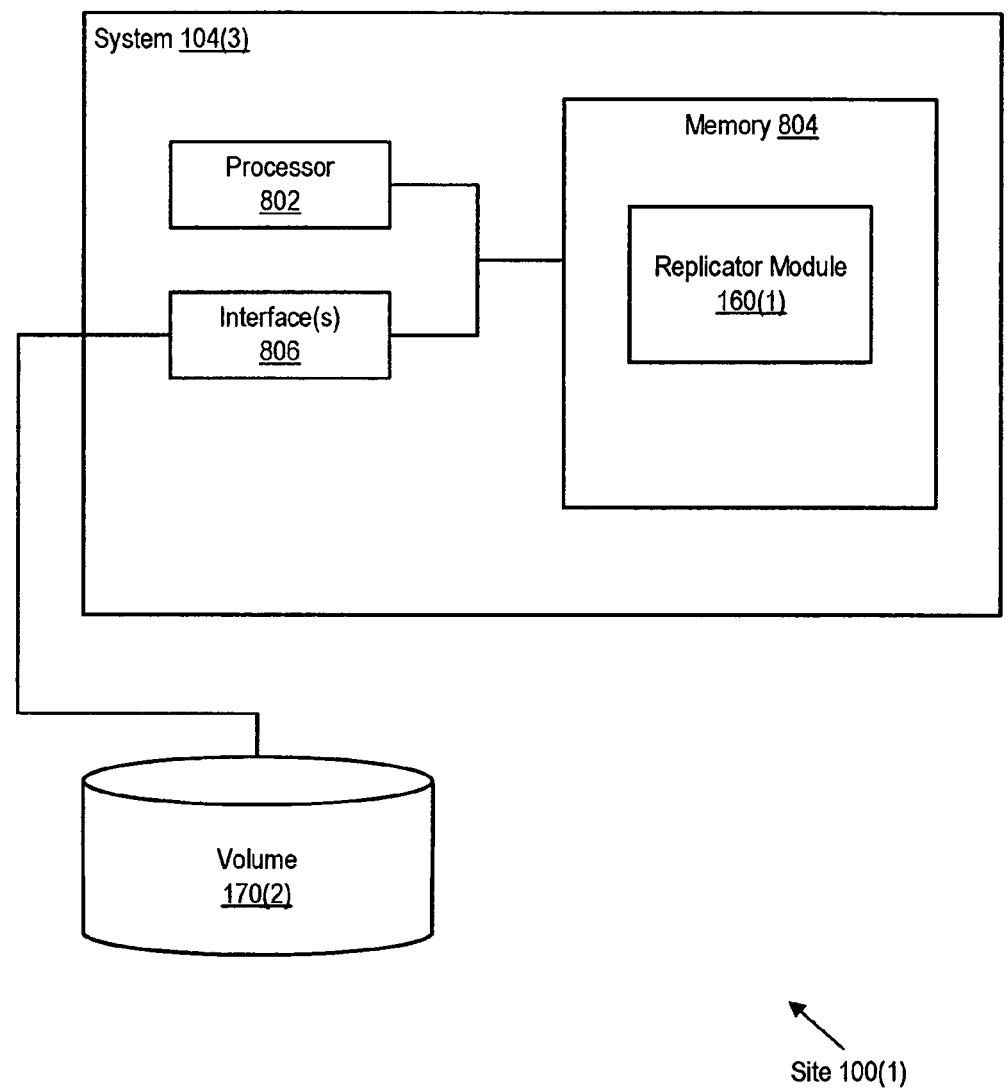
FIG. 8 is an example of a computing system, according to one embodiment.

FIG. 8 is a block diagram of site 100(1) illustrating how replicator module 160(1) can be implemented in software. As illustrated, system 104(3) includes one or more processors 802 (e.g., microprocessors, PLDs (Programmable Logic Devices), or ASICs (Application Specific Integrated Circuits)) configured to execute program instructions stored in memory 804. Memory 804 can include various types of RAM (Random Access Memory), ROM (Read Only Memory), Flash memory, MEMS (Micro Electro-Mechanical Systems) memory, and the like. System 104(3) also includes one or more interfaces 806. Processor 802, interface 804, and memory 806 are coupled to send and receive data and control signals by a bus or other interconnect.

Interface(s) 806 can include an interface to the storage devices on which data volume 170(1) (e.g., as shown in FIGS. 1, 3, and 5) is implemented, as shown in FIG. 8. Such storage devices can also store data such as a snappoint or change log for use by replicator 160(1) (all or part of this information can also be stored in memory 804). Interface(s) 806 can also include an interface to network 180 (as shown in FIGS. 1 and 5), for use in communicating with a system at another site when performing replication of data to or from that site.

The program instructions and data implementing replicator module 160(1) can be stored on various computer readable media such as memory 804. Similarly, the program instructions and data implementing applications such as mapping module 150(1) can also be stored on such computer readable media. In some embodiments, replicator software is stored on a computer readable medium such as a CD (Compact Disc), DVD (Digital Versatile Disc), hard disk, optical disk, tape device, floppy disk, and the like). In order be executed by processor 802, the instructions and data implementing replicator module 160(1) are loaded into memory 806 from the other computer readable medium. The instructions and/or data implementing can also be transferred to system 104(2) for storage in memory 806 via a network such as the Internet or upon a carrier medium. In some embodiments, a computer readable medium is a carrier medium such as a network and/or a wireless link upon which signals such as electrical, electromagnetic, or digital signals, on which the data and instructions implementing replicator module 160(1) are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
   initiating a write to a data file stored on a volume, wherein the initiating the write is performed by a production system; and
   initiating replication of the file, wherein
      the file is a file designated for replication, and
      the initiating the replication is performed by a non-production system.

2. The method of claim 1, wherein the initiating the replication of the file comprises:
   accessing mapping information, wherein
      the mapping information maps one or more extents of the file to a volume; and
   accessing change information, wherein
      the change information identifies regions of the volume that have been modified subsequent to a point in time;
   identifying one or more regions of the volume to which the file is mapped, using the mapping information; and
   identifying at least one of the one or more regions of the volume, using the change information, wherein
      the at least one of the one or more regions has been modified subsequent to the point in time.

3. The method of claim 2, wherein at least one modified file on the volume is not replicated, and the initiating the replication of the file further comprises:
   sending a copy of each of the identified ones of the one or more regions of the volume to a secondary system; and
   sending file meta-information associated with the identified ones of the one or more regions of the volume to the secondary system.

4. The method of claim 3, further comprising:
   receiving modification information, wherein
      the modification information identifies that the file has been modified subsequent to a particular point in time, and
      the mapping information and change information is accessed in response to the modification information.

5. The method of claim 4, wherein
   the accessing the mapping information comprises requesting mapping information from a mapping module;
   the accessing change information comprises accessing volume change information;
   the copy of each of the identified ones of the one or more regions of the volume is obtained from a point-in-time copy of a volume; and
   the volume change information and point-in-time copy are generated by a virtualization module implemented on at least one of: the production system, a switch, an array controller, or an appliance.

6. The method of claim 4, further comprising:
   receiving user input selecting the file from a plurality of files; and
   performing the initiating the replication for the file in response to the user input.

7. A method comprising:
   accessing mapping information, wherein
      the mapping information identifies that one or more regions of a storage volume store portions of a data file, wherein the file is a file designated for replication and is among a plurality of files stored on the storage volume;
   accessing change information, wherein
      the change information identifies whether the one or more regions of the storage volume have been modified subsequent to a point in time; and
   initiating replication to a secondary system of each region that is both identified by the mapping information as storing the file, and identified by the change information as being modified subsequent to the point in time, wherein the initiating is performed based upon both the accessing the mapping information, and the accessing the change information.

8. The method of claim 7, further comprising:
   receiving modification information identifying that, subsequent to a particular point in time, the file has been at least one of: modified, created, or deleted; and
   requesting the mapping information and the change information for the file in response to the modification information.

9. The method of claim 8, wherein the initiating the replication of the regions comprises:
   sending file meta-information associated with the modified ones of the regions to the secondary system.

10. The method of claim 9, wherein
    at least one file on the storage volume is not replicated,
    a snappoint comprises the change information and a point-in-time copy, and
    the initiating replication comprises sending a copy of each of the modified ones of the regions of the storage volume from the point-in-time copy to the secondary system.

11. The method of claim 10, wherein
    the change information is received from a volume virtualization module, and
    the volume virtualization module is implemented on at least one of: a host computer system, an appliance, an array controller, or a switch.

12. The method of claim 9, wherein
    the storage volume is coupled to a production system,
    the production system implements a file system,
    the initiating replication is performed by a non-production system, and
    the non-production system is at least one of a computer system, a network device, or a storage device controller.

13. The method of claim 12, further comprising:
    requesting the mapping information from a mapping module.

14. The method of claim 9, wherein
    the storage volume is coupled to a production system,
    the production system implements a file system, and
    the initiating replication is performed by the production system.

15. The method of claim 9, further comprising:
    receiving user input selecting the file from a plurality of files; and
    performing the initiating the replication for the file in response to the user input.

16. A system comprising:
    means for accessing mapping information, wherein
       the mapping information identifies that one or more regions of a storage volume store portions of a data file, wherein the file is a file designated for replication and is among a plurality of files stored on the storage volume;
    means for accessing change information, wherein
       the change information identifies whether the one or more regions of the storage volume have been modified subsequent to a point in time; and
    means for initiating replication to a secondary system of each region that is both identified by the mapping information as storing the file, and identified by the change information as being modified subsequent to the point in time, wherein the initiating is performed based upon both the accessing the mapping information, and the accessing the change information.

17. The system of claim 16, further comprising:
means for receiving modification information identifying that, subsequent to a particular point in time, the file has been at least one of modified, created, or deleted; and
means for requesting the mapping information and the change information for the file in response to the modification information.

18. The system of claim 17, wherein
at least one file on the storage volume is not replicated,
a snappoint comprises the change information and a point-in-time copy, and
initiating replication comprises sending a copy of each of the modified ones of the one or more regions of the storage volume from the point-in-time copy to the secondary system.

19. The system of claim 18, further comprising:
a production system coupled to the storage volume, wherein
the production system implements a file system; and
a non-production system, wherein
the non-production system comprises the means for initiating replication, and
the non-production system is at least one of: a computer system, a network device, or a storage device controller.

20. A computer readable storage medium comprising program instructions executable to:
access mapping information, wherein
the mapping information identifies that one or more regions of a storage volume store portions of a data file, wherein the file is a file designated for replication and is among a plurality of files stored on the storage volume;
access change information, wherein
the change information identifies whether the one or more regions of the storage volume have been modified subsequent to a point in time; and
initiate replication to a secondary system of each region that is both identified by the mapping information as storing the file, and identified by the change information as being modified subsequent to the point in time, wherein the initiating is performed based upon both the accessing the mapping information, and the accessing the change information.

21. The computer readable storage medium of claim 20, wherein the program instructions are further executable to:
receive modification information identifying that, subsequent to a particular point in time, the file has been at least one of modified, created, or deleted; and
request the mapping information and the change information for the file in response to the modification information.

22. The computer readable storage medium of claim 21, wherein
at least one file on the storage volume is not replicated,
a snappoint comprises the change information and a point-in-time copy, and
initiating replication comprises sending a copy of each of the modified ones of the one or more regions of the storage volume from the point-in-time copy to the secondary system.

23. A system comprising:
a processor; and
a memory coupled to the processor, wherein the memory stores program instructions executable by the processor to:
access mapping information, wherein
the mapping information identifies that one or more regions of a storage volume store portions of a data file, wherein the file is a file designated for replication and is among a plurality of files stored on the storage volume;
access change information, wherein
the change information identifies whether the one or more regions of the storage volume have been modified subsequent to a point in time; and
initiate replication to a secondary system of each region that is both identified by the mapping information as storing the file, and identified by the change information as being modified subsequent to the point in time, wherein the initiating is performed based upon both the accessing the mapping information, and the accessing the change information.

24. The system of claim 23, wherein the program instructions are further executable by the processor to:
receive modification information identifying that, subsequent to a particular point in time, the file has been at least one of: modified, created, or deleted; and
request the mapping information and the change information for the file in response to the modification information.

25. The system of claim 24, wherein
at least one file on the storage volume is not replicated,
a snappoint comprises the change information and a point-in-time copy, and
initiating replication comprises sending a copy of each of the modified ones of the one or more regions of the storage volume from the point-in-time copy to the secondary system.

26. The method of claim 7, further comprising:
selecting a set of regions for replication, wherein the set of regions for replication is selected based upon (i) the change information and (ii) the mapping information.

27. The method of claim 7, wherein at least one modified file on the storage volume is not replicated.

28. The system of claim 16, wherein at least one modified file on the storage volume is not replicated.

29. The computer readable storage medium of claim 20, wherein at least one modified file on the storage volume is not replicated.

30. The system of claim 23, wherein at least one modified file on the storage volume is not replicated.

* * * * *